Feb. 3, 1959 P. C. PATIN 2,871,831
INTERNAL GEAR MACHINES
Filed Feb. 2, 1955 7 Sheets-Sheet 1

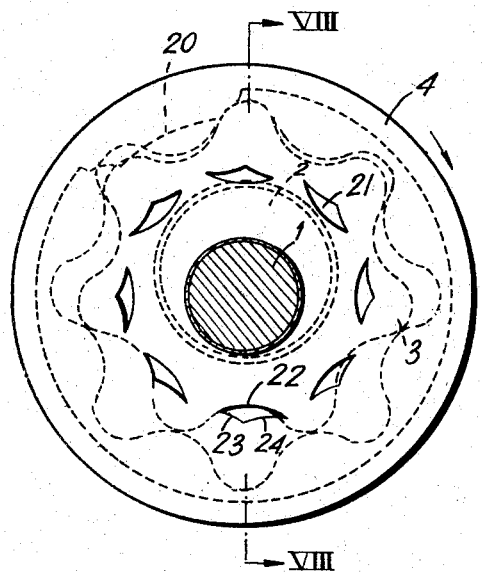
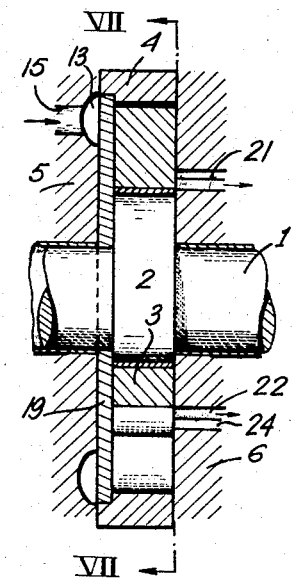
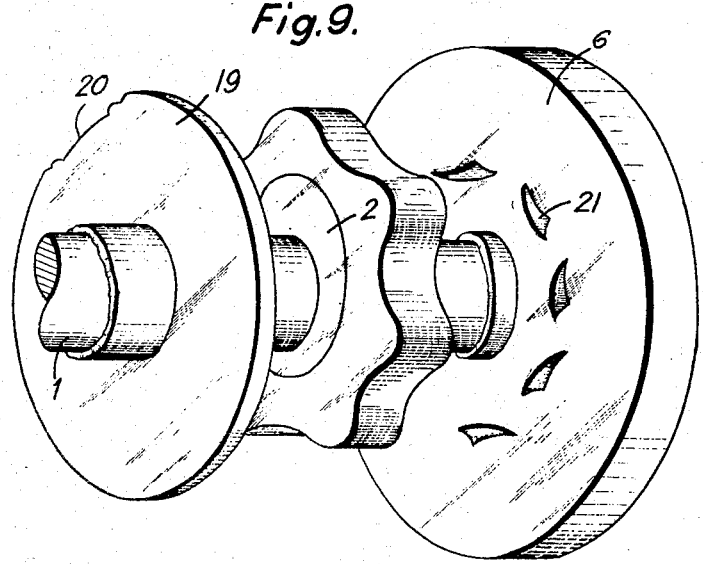

Feb. 3, 1959

P. C. PATIN 2,871,831

INTERNAL GEAR MACHINES

Filed Feb. 2, 1955

P. C. PATIN 2,871,831

INTERNAL GEAR MACHINES

Filed Feb. 2, 1955

P. C. PATIN 2,871,831

INTERNAL GEAR MACHINES

Filed Feb. 2, 1955

Feb. 3, 1959 P. C. PATIN 2,871,831
INTERNAL GEAR MACHINES
Filed Feb. 2, 1955 7 Sheets-Sheet 7

United States Patent Office 2,871,831
Patented Feb. 3, 1959

2,871,831

INTERNAL GEAR MACHINES

Pierre Charles Patin, Paris, France

Application February 2, 1955, Serial No. 485,783

Claims priority, application France February 15, 1954

23 Claims. (Cl. 121—68)

The present invention relates to improvements in internal gear machines such as motors, pumps and compressors, for example, notably of the type disclosed in the applicant's U. S. patent applications Serial No. 361,354, filed June 12, 1953, for "Gear Engines" and Serial No. 480,038, filed January 5, 1955, for "Conjugate Gears and Method of Machining Same."

Internal gear machines of this type comprise in a casing a mating pair of intermeshing toothed members formed by an internally toothed ring gear which is held against rotation and a pinion or rotor having one tooth less than said ring gear, and mounted on an eccentric carried by a rotary shaft coaxial with said ring gear. Thus, due to the relative transverse displacements of the pinion and ring gear, a series of fluid-tight pockets are created, the volume of these pockets varying from a maximum value to a minimum value, the latter being in most cases close to zero.

In machines of this general type it is not necessary to provide valves or the like, for the fluid distribution as both inlet and exhaust may be accomplished according to the specific application contemplated either by means of rotary distributors or through suitably located ports formed in the walls enclosing longitudinally the mating gears.

Now, this invention relates more particularly to means designed to control the distribution, i. e. the inlet and exhaust of fluids in machines of the general type disclosed hereinabove, whether compressible or incompressible fluids are used, the fact being accounted for that at a predetermined time the dimension of any one of the pockets formed between the teeth of the ring gear and of the pinion is determined by the angular position of the rotary shaft on which the pinion is mounted.

According to this invention, the timing of the machine, i. e. the opening or closing of the inlet and exhaust ports, is subordinate to the angular position of the rotary shaft, so as to ensure either a permanent fluid connection between the variable-volume pockets, on the one hand, and the inlet or exhaust of the machine, on the other hand, during their expansion and contraction phases, respectively, in the case of incompressible fluids, or the fluid connection between these variable-volume pockets with the inlet and exhaust only during fractions of their expansion and contraction phases, in the case of compressible fluids.

The timing or distribution may be effected either by means of a pair of timing or distributor discs, one for the inlet and the other for the exhaust, respectively, whereby the machine can be used as an incompressible-fluid machine or as a machine designed to generate differences of pressure, or by means of an inlet distributor associated with exhaust ducts formed in the corresponding flange or wall of the machine, whereby the machine can be used as a compressible-fluid motor, or, according to a third alternative, with the assistance of inlet and exhaust ducts formed in both flanges or walls of the machine, whereby the machine can be used as an internal combustion engine. Each timing device or distributor may be adapted either to contact the pinion directly or to be connected therewith through fixed or movable members having ducts or adequate passages formed therein, notably in those cases where dead spaces have a negligible importance, especially when incompressible fluids are employed.

This timing may also be provided either through ducts formed in the pinion teeth and leading into ports formed in the flanges, or through passages or recesses bored in the teeth of the internally toothed ring gear and associated with one or more distributors.

It is another object of this invention to provide in internal gear machines of the types broadly set forth hereinabove, a distribution rendering them notably usable for power transmission purposes and the like. If a compressible fluid such as air is employed, the power transmission is effected through a machine of the type specified hereinabove acting as a compressor and delivering compressed fluid to a motor. If an incompressible fluid such as water or oil is employed, the power transmission consists of a pump and a motor. In most cases, the advantageous feature of power transmissions is to convert an input power received in the form of a constant or substantially constant torque and at a constant or substantially constant velocity into an equal power delivered at a variable velocity under variable torque conditions.

If the power transmission is of the variable-speed type and a compressible fluid is used, according to this invention, the compressor operates under constant velocity and delivery pressure conditions, and the internal gear machine used as a motor and driving the counter-shaft or secondary shaft of the transmission may be caused to operate under variable torque and speed conditions by simply varying the time during which the compressed fluid is introduced therein.

If the transmission is of the variable-speed type and an incompressible fluid is employed, according to this invention, the internal gear machine used as a motor comprises means for varying the maximum and minimum volumes of the variable-capacity pockets, these means being either hand-controlled or automatically-controlled.

In internal gear machines of the type hereinabove specified and used as motors, servo-motors or transmission receivers the torque employed is that transmitted from the pinion or rotor to the eccentric.

According to the present invention, in an internal gear machine of the type described hereinabove wherein the motive fluid is incompressible the torque applied by the fluid to the pinion or rotor itself is utilized directly. As this rotor rotates in the reverse direction with respect to the driving shaft at a velocity equal to $1/n$ the shaft speed, $n$ being the number of teeth of the internally toothed outer gear and $(n-1)$ that of the pinion, therefore, the torque applied to the rotor is $n$ times greater than the torque transmitted from this rotor to the eccentric.

According to the present invention, the internal gear machine comprises a secondary shaft or output shaft aligned on the main rotary shaft carrying the eccentric, and operatively connected to the pinion or rotor through a coupling device adapted to transmit to said secondary shaft the eccentric movement of the rotor with respect to the common shaft axis.

According to an advantageous form of embodiment, the above-specified coupling device comprises a flat plate or flange mounted endwise of the secondary shaft and a series of relatively small links each having one pin journalled in a bore formed in the rotor and another pin journalled in a bore formed in the aforesaid plate, the distance between centers of the pins of any one link being equal to the throw of the motor eccentric, the bores formed in the plate and rotor being spaced on these two members at equal angular intervals on circles of same radii. In this embodiment use is made of the fact that, with respect to a plane connected to the secondary shaft and having the same average velocity as the rotor, any desired point of this rotor will describe a circle of same radius as the eccentric radius.

Finally, it is another object of this invention to provide a reduction-gear providing a ratio of $$\frac{1}{n}$$

and a step-up gear providing a ratio of $-n$, both comprising a device of the type broadly described hereinabove wherein a primary or impeller movement is applied without the assistance of any intermediate fluid to the main, eccentric-carrying shaft, in the case of a reduction-gear, and to the secondary, plate-carrying shaft, in the case of a step-up gear.

Other features and advantages of this invention will appear as the following description proceeds with reference to the attached drawings forming part of this specification and illustrating diagrammatically by way of example a few manners in which the invention may be carried out in the practice. In the drawings:

Figs. 7 and 8 are corresponding sections respectively taken upon the lines VII—VII and VIII—VIII, and showing an internal gear machine according to this invention and usable as compressible-fluid motor.

Fig. 9 is an exploded isometric view of the main component members of the machine illustrated in Figs. 7 and 8.

Figure 1:
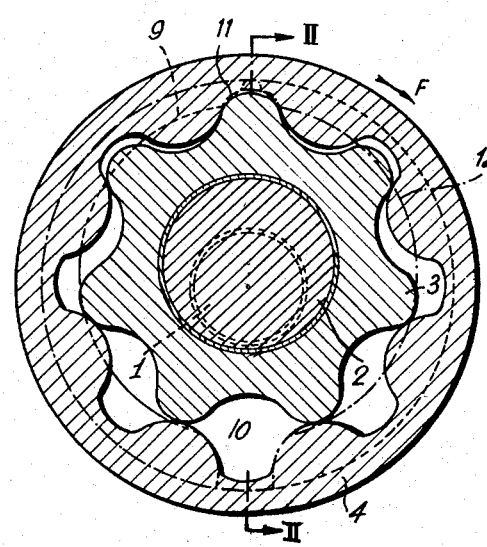
Figs. 1 and 2 are corresponding sections taken upon the lines I—I and II—II of an internal gear machine for incompressible fluids according to this invention, usable as a pump.

In the embodiments illustrated in Figs. 1 through 13, a shaft 1 is formed with an eccentric portion 2 on which a seven-teeth rotor-forming pinion 3 is mounted. This pinion 3 engages an internally toothed ring gear or stator gear 4 held against rotation and having eight teeth (thus constituting with the pinion a one-tooth difference assembly) the outlines of the ring gear teeth and those of the pinion teeth forming mating curves. Shaft 1 is coaxial with the ring gear 4. The pocket-creating device thus constituted is enclosed between two flanges or equivalent members 5, 6. The operation of this unit is well known to specialists and therefore requires no detailed description.

Figure 2:
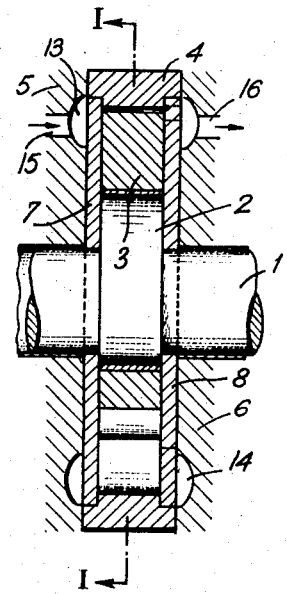
Figure 3:
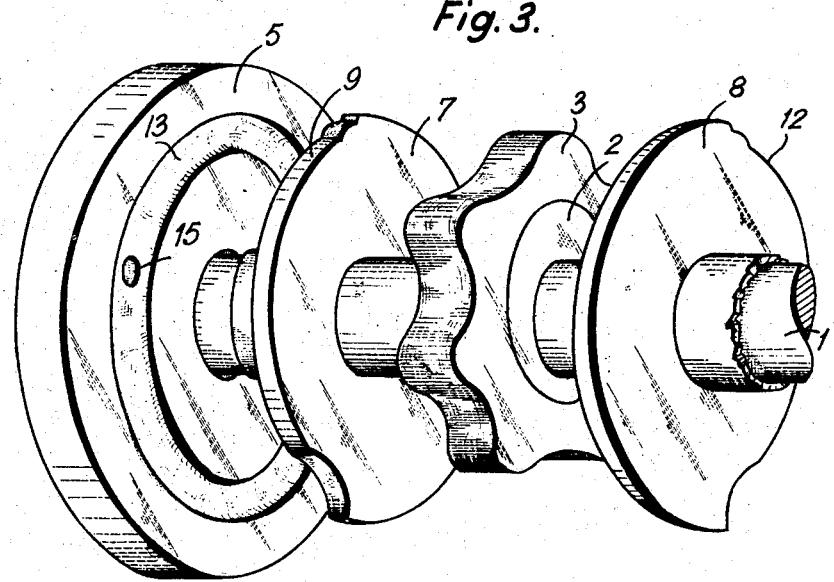
Fig. 3 is an exploded isometric view of the main component elements of the machine illustrated in Figs. 1 and 2.

The incompressible-fluid machine, whether pump or motor, illustrated in Figs. 1 to 3 comprises, located between the flanges 5, 6 and the rotor 3, a pair of discs 7, 8 secured on the shaft 1 and adapted to act as inlet and exhaust timing members, respectively. The inlet disc 7 is formed at its outer periphery with an indentation 9 of a width decreasing in the direction from the maximum-volume pocket 10 to the minimum-volume pocket 11, each end portion of this indentation having the same outline as the corresponding or registering teeth of the rotor-forming pinion 3.

Similarly, the exhaust disc 8 is formed with a peripheral indentation 12 of a width increasing from the minimum-volume pocket 11 to the maximum-volume pocket 10, the terminal portions of this indentation having the same outline as the registering teeth of the stator-forming gear 4. Both flanges 5, 6 are formed with annular grooves 13, 14 connected through ducts 15, 16 with the inlet and exhaust, respectively. Thus, the fluid circulated in the machine is constantly connected with the inlet during the pocket expansion and with the exhaust during the pocket contraction. The importance of dead spaces or clearances is negligible or at least not critical due to the incompressibility of the fluid utilized.

Figure 4:
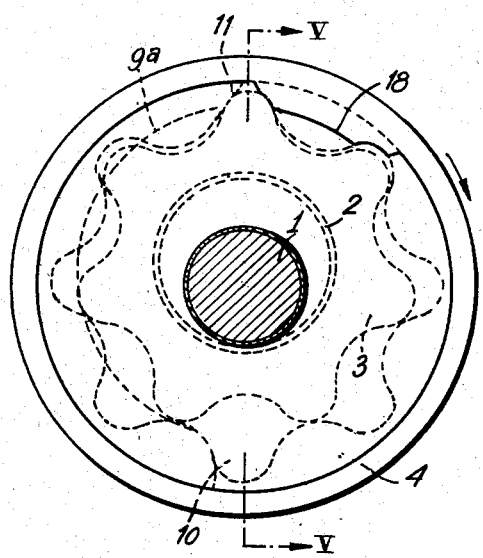
Figs. 4 and 5 are corresponding sections taken upon the lines IV—IV and V—V, and showing an internal gear machine designed in accordance with the teachings of this invention and usable as a compressor.
Figure 5:
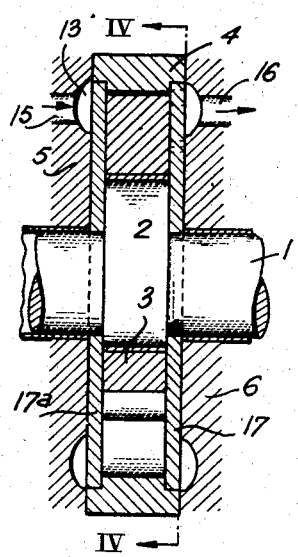
Figure 6:
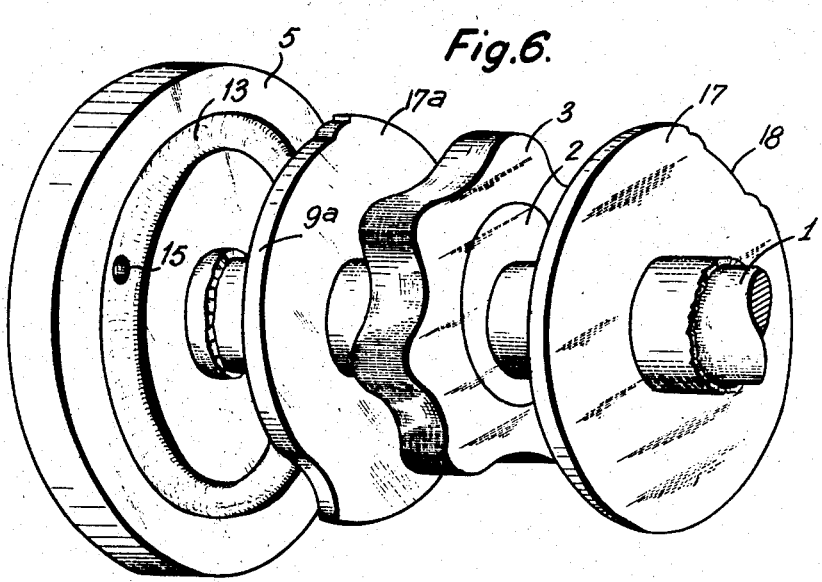
Fig. 6 is an exploded isometric view of the main component elements of the machine illustrated in Figs. 4 and 5.

In the compressible-fluid machine illustrated in Figs. 4 to 6, a pair of discs 17a and 17 positioned between the flanges 5, 6 and the rotor 3, are secured on the shaft 1 and act as inlet and exhaust distributors, respectively. The inlet disc 17a is similar to the inlet disc 7 of the incompressible-fluid machine illustrated in Figs. 1 to 3. The exhaust disc 17 is provided with a peripheral indentation 18 having substantially the same length as the root arc of one stator tooth, the terminal portions of this indentation having the same outline as the aforesaid tooth. As in the example illustrated in Figs. 1 to 3, both flanges 5, 6 are formed with annular grooves 13, 14 connected through ducts 15, 16 with the inlet and exhaust, respectively. The variable-volume pockets are thus connected with the inlet during the whole volume-expansion period of these pockets, thereby avoiding losses. On the other hand, these variable-volume pockets are connected with the exhaust only during the terminal period of the compression phase, this period being subordinate to the maximum pressure to be developed.

In the specific case of the machine shown in Figs. 4 to 6 and utilized as a compressor, it is also necessary to make due allowance for the lost or dead space, although the latter may be almost eliminated by construction.

This suppression of dead space is desirable to reduce losses resulting from an expansion of the compressed fluid in the dead space. In a similar machine utilized as a vacuum pump, operating substantially in the same way as a compressor, the dead space must compulsorily be eliminated.

The compressible-fluid machine illustrated in Figs. 7 to 9 and more particularly usable as an air motor comprises only one timing or distributor disc 19 for the inlet. This disc is similar to the exhaust disc 17 of the machine illustrated in Figs. 4 to 6 and is formed with a peripheral indentation 20 extending over one fraction of the expansion phase of the variable-volume pockets. This distributor is connected with the annular groove 13 formed in the flange 5, on the one hand, and with the inlet, through the duct 15 leading into this groove, on the other hand. Exhaust is effected through ports 21 formed in the flange 6. These ports 21 are arranged so that they are uncovered only in the vicinity of the position of maximum expansion of the variable-volume pockets and during one fraction of the period during which the volume of these pockets is substantially constant. Preferably, these ports are of substantially triangular shape with the sides of the triangle formed by circular arcs 22, 23 and 24 corresponding in shape with the root outline and also with the outline of the adjacent portions of the rotor teeth.

Figure 10:
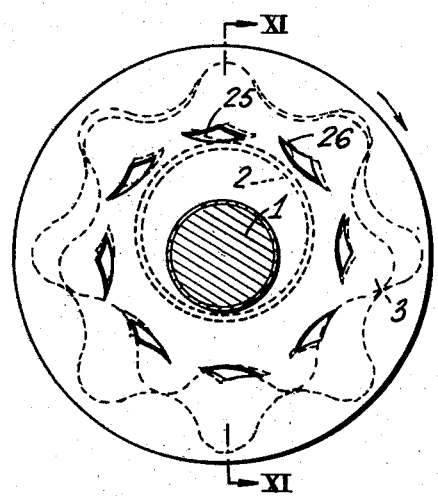
Fig. 10 is an end view of an internal gear machine according to this invention and usable as an internal combustion engine.
Figure 11:
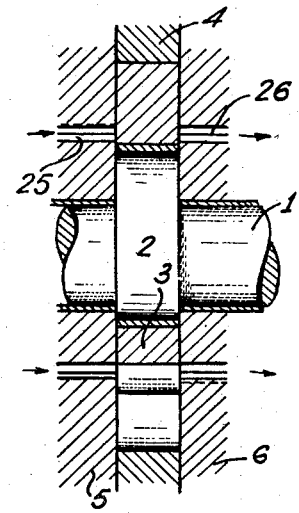
Fig. 11 is a cross-sectional view of the machine illustrated in Fig. 10, the view being taken upon the line XI—XI of Fig. 10.
Figure 12:
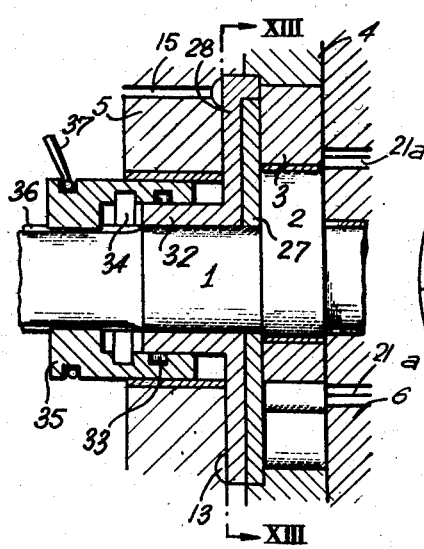
Fig. 12 is an axial section of an internal gear machine with adjustable distributor according to this invention and usable as a compressor.
Figure 13:
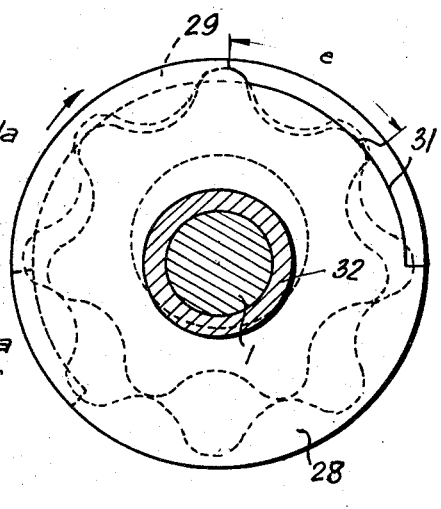
Fig. 13 is a cross-section taken upon the line XIII—XIII of Fig. 12.

In the case of a compressible-fluid machine usable as an internal combustion engine, as illustrated in Figs. 10 and 11, no timing disc is secured to the shaft 1. As the inlet of fresh air and the exhaust of burnt gases take place only in the vicinity of the point of maximum expansion, both are produced, as in the case of the exhaust in the machine illustrated in Figs. 7 to 9, with the assistance of ports 25, 26 formed in the flanges 5 and 6 and connected to the inlet and exhaust, respectively, the positions and shapes of these ports being calculated as in the case of the compressible-fluid motor.

Figure 14:
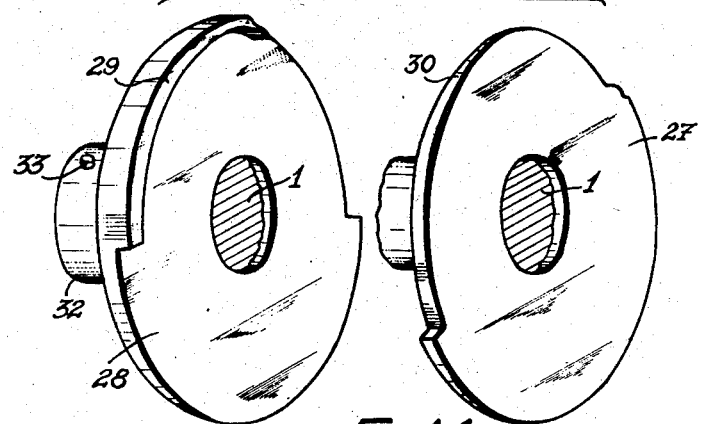
Fig. 14 is an exploded isometric view showing the pair of timing discs constituting the adjustable distributor of the machine illustrated in Figs. 12 and 13.

Considering now the application of the principles of this invention to the design of internal gear machines of the type broadly specified hereinabove usable as pumps and motors for transmitting power under variable-speed conditions, if a compressible fluid is employed, the compressor operating under constant velocity and delivery pressure conditions, the internal gear machines acting as a motor driving the countershaft of the transmission will operate under variable torque and speed conditions by simply altering the inlet time period of the compressed fluid. This variation may be obtained through the device illustrated in Figs. 12 to 14.

In this device the distributor consists of a first disc 27 secured on the shaft 1 and another disc 28 engaging the disc 27 and formed with an arcuated projecting edge 29 adapted to center the disc 28 relative to the disc 27, as shown. Both discs 27, 28 are formed with peripheral indentations 30, 31 similar to the peripheral indentations 9 and 18 illustrated in Figs. 1 and 4. Besides, the disc 28 is formed with a hub 32 mounted for axial sliding motion on the shaft 1 and provided with a pair of diametrally opposed pins 33 slightly shifted from each other in the axial direction. These pins 33 engage a helical groove 34 formed internally of a sleeve member 35 rotatably driven from the shaft 1 through splines 36.

The position of the sleeve member 35 along the shaft 1 is adjustable by means of a fork or like member 37 adapted at the same time to determine the relative angular positions of the discs 27 and 28. Thus, the actual aperture of the inlet distributor comprised of the pair of discs 27, 28 is constituted by the peripheral space existing between the indentations 30 and 31, such as the space *e* of Fig. 13. In the embodiment shown in Fig. 12 the adjustable distributor is positioned on the inlet side and communicates through the annular groove 13, on the one hand, and the duct 15 formed in the flange 5, on the other hand, with the inlet. On the exhaust side, the flange 6 is provided with ports 21a similar to those of the embodiment shown in Figs. 7 to 9.

To provide a variable-speed transmission with an incompressible fluid, it is necesary to vary the maximum volume and minimum volume of the pockets employed in the machine. To simplify the disclosure, the terms "hydraulic transmission" will be used to designate a transmission in which an incompressible fluid is employed, and the term "oil" will designate the incompressible fluid proper, in accordance with the now generally accepted practice, it being understood however that these terms should not be construed as limiting whatsoever the scope of the invention.

A hydraulic transmission according to this invention comprises (see Fig. 17) an oil pump 38 of the type illustrated in Figs. 1 to 3, and a motor 39 also derivated from the type illustrated in Figs. 1 to 3 but designed according to the following characteristic features (see Figs. 15 and 16):

A variation in the volume of the motor pockets results from the fact that the rotor and ring gear are movable relative to each other in the direction of the ring gear axis. In the specific case contemplated herein it is the ring gear which is allowed to slide within a conveniently arranged space, the rotor having a fixed position relative to the end flanges.

Figure 16:
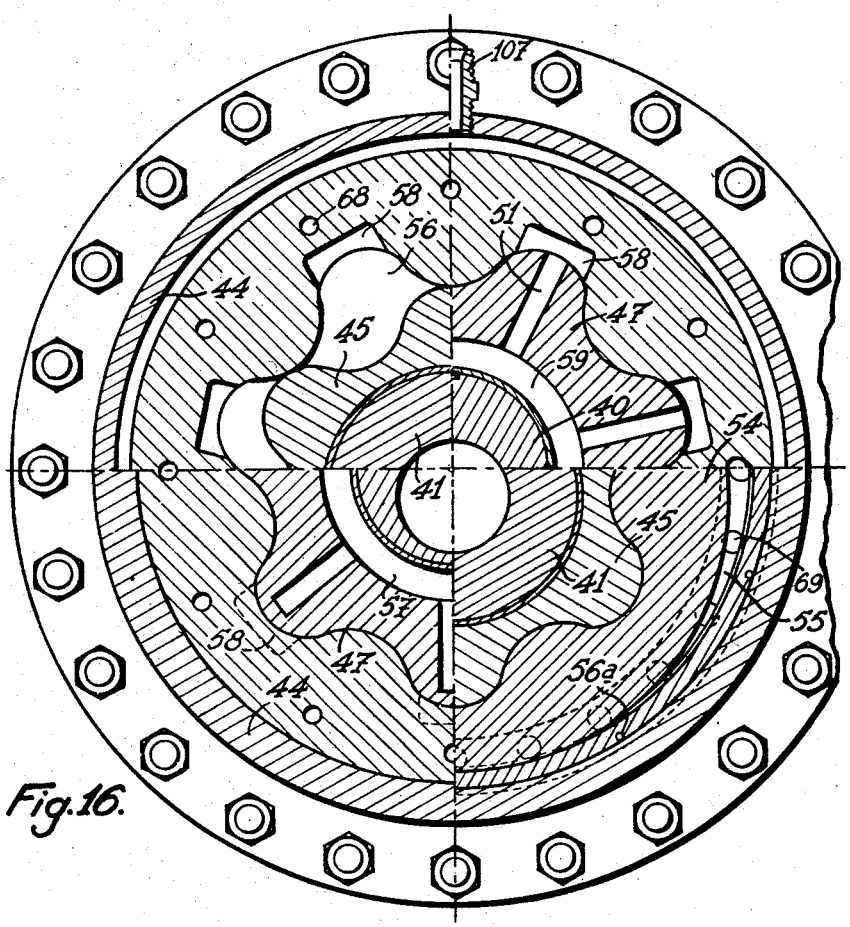
Fig. 16 represents in the left-hand side upper quarter a sectional view of Fig. 15 taken along line A—A, in the right-hand side upper quarter a sectional view of Fig. 15 taken along line B—B, in the right-hand side lower quarter a sectional view of Fig. 15 taken along line C—C, and in the left-hand side lower quarter a sectional view of Fig. 15 taken along line D—D.
Figure 15:
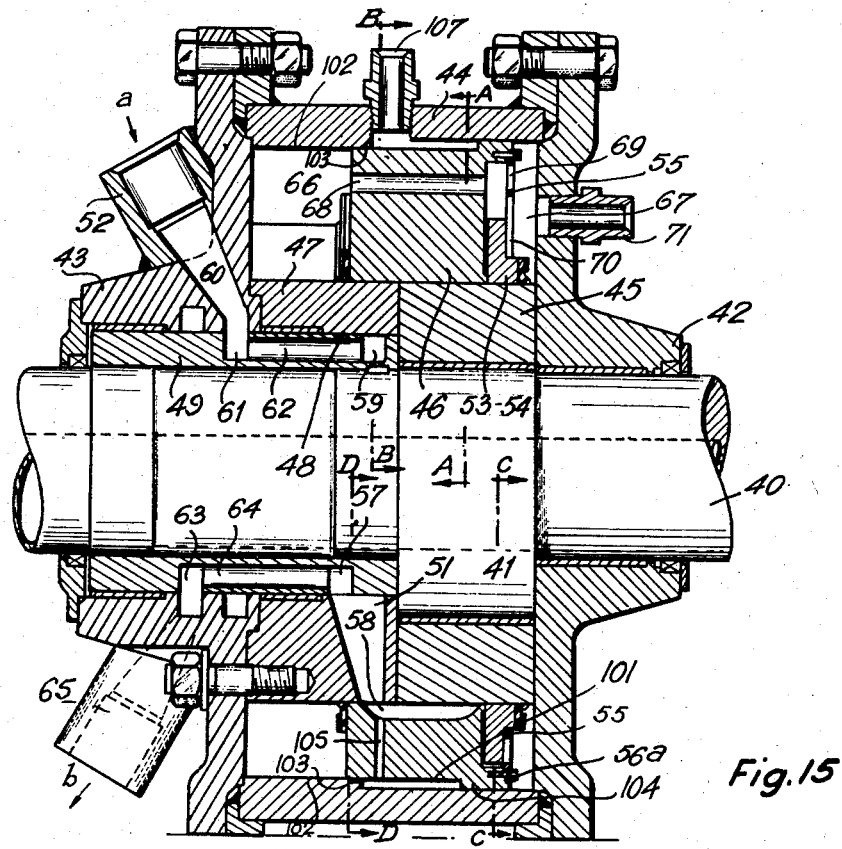
Fig. 15 is an axial section showing an internal gear machine according to the invention and usable as a variable-speed motor.

This construction is exemplified in Figs. 15 and 16. The rotary shaft 40 provided with an eccentric portion 41 is mounted in a casing 44 by means of bearings provided in end covers or flanges 42—43. The eccentric portion 41 has mounted thereon the pinion or rotor 45 of which the teeth have an outline mating that of the teeth of an axially slidable internally toothed ring gear 46 held against rotation. In fact, this ring gear 46 is adapted to slide on the rotor 45 and also on a stationary sleeve member 47 mounted endwise of the rotor 45 on the shaft 40, the outer surface of this sleeve member 47 corresponding exactly in shape to the inner cross-sectional contour of the ring gear 46. The sleeve member 47 has formed therethrough a cylindrical bore 48 adapted to receive a distributor member 49 rigid with the shaft 40 and adapted to communicate with ducts 51 for a purpose to be defined presently. On the other hand, the rotor 45 has mounted thereon a disc 53 formed with a flange 54. This flange 54 is adapted to slide over the rotor 45 and consequently the inner surface of the flange 54 corresponds exactly in shape to the external cross-sectional outline of this rotor 45. The outer diameter of disc 53 is calculated to enable the disc to permanently close all the pockets 56 formed in succession between the teeth of the rotor 45 and slidable ring gear 46. An annular member 55 fastened by screws 56a on the slidable ring gear 46 applies permanently the flange disc 53 against the lateral face of the ring gear 46; therefore, this flanged disc 53 effects in relation to the rotor 45 the same sliding movement as the slidable ring gear 46 in relation to the rotor 45 and sleeve member 47. As a result, the volume of the pockets 56 formed between the teeth of the ring gear 46 and rotor 45 and limited in the lateral direction by the sleeve member 47 and flanged disc 53 is variable not only on account of the rotation of the rotor driven from the eccentric shaft, according to the known principle of operation of one-tooth difference gear machines, but also on account of the fact that the assembly consisting of ring gear 46 and disc 53 is adapted to slide on the assembly comprising the rotor 45 and sleeve member 47. Thus, a motor is provided wherein the maximum volume and the minimum volume of the pockets in which the hydraulic power is generated may be varied in the same proportions; of course the same principle could be applied to a pump.

The oil distribution for the inlet and exhaust is accomplished by the distributor 49 under the following conditions. The distributor 49 is rotatably driven from the shaft 40 and formed with a semi-annular groove 57 extending over one fraction of its peripheral edge and acting as an exhaust aperture communicating with radial ducts 51 bored through the sleeve member 47, and longitudinal cavities 58 formed in the roots of the teeth of the slidable ring gear 46. The inlet takes place through a semi-annular groove 59 formed in the distributor 49 and communicating with the pockets 56 through ducts 51 formed in the sleeve member 47. The grooves 57 and 59 have the same relative arrangement as the indentations 12 and 9 of Figs. 1 to 3. Oil is admitted through a junction 52 connected to a duct 60 formed in the flange 43, said duct opening in an annular manifold 61 formed on said flange and on the distributor 49 and which communicates through a duct 62 with the semi-annular groove 59. From the semi-annular groove 57 the exhaust proper is effected through a duct 64 bored in the distributor 49, an annular exhaust manifold 63 formed on said distributor and on flange 43 and exhaust junction 65 welded on said flange. The recesses 66, 67 provided on either side of ring gear assembly slidably mounted in the casing 44 have their volumes varying as the ring gear assembly moves axially in the casing 44, and furthermore they communicate with each other through ducts 68 formed in the ring gear and through orifices 69 bored in the annular member 55 as well as through the inner hole 70 of said member. An intake member 71 for static pressure secured on flange 42 connects said recesses to the utilization circuit.

The position of the slidable ring gear 46 may be adjusted through any suitable means under the control of the operator. Thus, the outer surface of this ring gear 46 may be provided with rack teeth meshing with a pinion journalled in the casing. The same displacement may also be controlled by means of a lever or fork. Thus, a hydraulic transmission is obtained which operates under constant-pressure conditions and affords a very extensive range of speed and torque variations.

Figure 17:
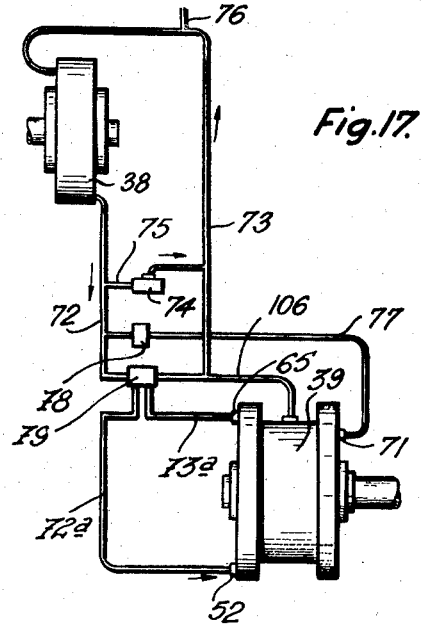
Fig. 17 is a diagrammatical view showing a transmission of the incompressible-fluid compressor and pump type, utilizing the internal gear machine illustrated in Figs. 15 and 16.

The hydraulic connections between the pump 38 and motor 39 comprise, as shown in Fig. 17, a pipe 72 through which the motor is fed with fluid delivered by the pump, and a return pipe 73 extending from the motor to the pump, said pipes being connected to a flow-reverser 79 connected in turn to the motor through pipes 72a and 73a. A by-pass connection 75 having a relief valve 74 inserted therein is mounted between the pipes 72 and 73 to protect the hydraulic circuit assembly against pressure surges or overloads. In the return circuit 73 the reduction in pressure to the atmospheric value is effected through an air valve 76 permitting also the oil expansion. A branch 77 having a pressure reducing device 78 inserted therein feeds the static pressure intake 71.

The transmission illustrated in Figs. 15 to 17 may operate in a fully automatic manner by adapting exactly the pocket volumes to the pump output, according to the motor velocity.

For this purpose, the cylindrical casing 44 is formed on a part of its inner surface facing the rotor 45 with a cylindrical enlargement 101 forming a cylindrical chamber. Said chamber terminates with a shoulder 102 formed with a bevel-cut-portion 103 having a slight slope. Further the slidable ring gear 46 is formed with a cylindrical part 104 adapted to slide within chamber 101. A radial trailing duct 105 is formed through ring gear 46 for connecting a pocket 56 to said chamber 101 when the ring gear is at the end of its stroke towards the right-hand side of Fig. 15. Said chamber 101 is further connected to the exhaust pipe 73 through a return pipe 106 leading into a junction 107 secured on the cylindrical casing 44.

The static pressure given by the pump and which is exerted in recesses 66 and 67 at first applies the flanged disc 53 on the adjacent side of ring gear 46 and therefore ensures an interconnection between said two members. The force acting on the ring gear on the right-hand side of Fig. 15 is equal to the algebraic summation of the force exerted by the static pressure on the area comprised between the teeth outline of rotor 45 and the inner circular cross-section of chamber 101 and of the force exerted by the mean pressure existing in pockets 56 on the surface of the flanged disc 53 comprised between the teeth outline of ring gear 46 and the teeth outline of rotor 45. The force acting on the ring gear on the left-hand side of Fig. 15 is equal to the force exerted by the static pressure on the area comprised between the teeth outline of sleeve member 47, which is equal to the teeth outline of ring gear 46, and the inner circular cross-section of casing 44. When pump 38 is started, the mean pressure existing in pockets 56 is submitted to a pressure drop through trailing duct 105, chamber 101, junction 107 and return pipe 106. At that time the force exerted on the ring gear on the right-hand side thereof is slightly greater than that exerted on its left-hand side, which induces a displacement of said ring gear towards the left until the trailing edges moves beyond the bevel-cut portion 103. Then the device is coupled and the ring gear which slides on sleeve member 47 occupies a position for which the force generated by the differential pressure resulting from the application of the static pressure on the two sides of said ring gear balances the force exerted on the lateral walls of the pockets by the actual mean pressure existing therein.

Thus, the dimensions of these expansion pockets 56 may be adjusted permanently with respect to the required velocity and torque, whereby the motor operates under constant pressure and, consequently, with a substantially constant power output equalling the primary power output irrespective of the secondary torque and velocity.

Figure 18:
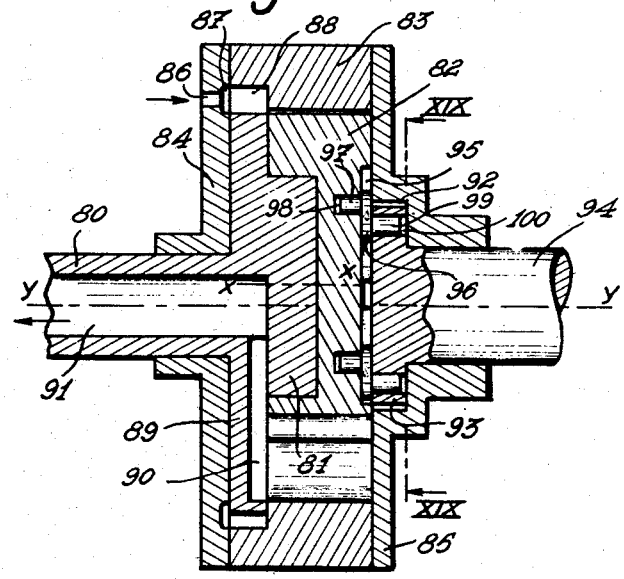
Figs. 18 and 19 are sections taken respectively upon the lines XVIII—XVIII and XIX—XIX showing an internal gear machine utilizing an incompressible fluid, wherein the torque applied by the fluid to the rotor is utilized directly.
Figure 19:
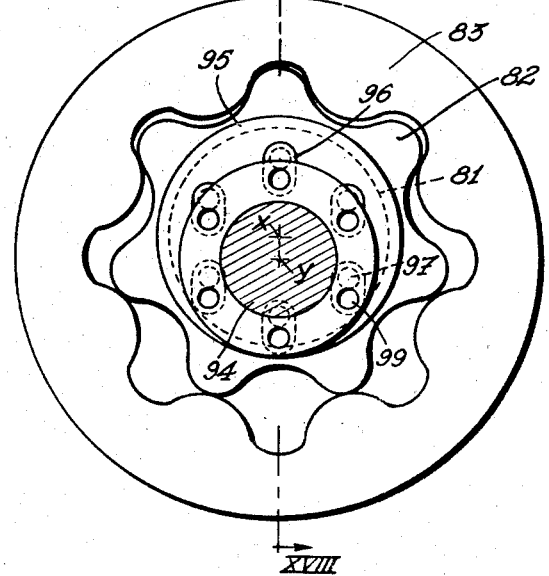

In the embodiment illustrated in Figs. 18 and 19 a primary hollow shaft 80 is formed with an eccentric portion 81 having mounted thereon a seven-teeth pinion 82 acting as a rotor. This pinion 82 meshes an eight teeth internally toothed ring gear 83, held against rotation; the teeth outlines of said pinion and said ring gear form mating curves. The fluid trapping device thus constructed is enclosed in a pair of end plates 84, 85 fastened in any known and suitable manner to the ring gear 83. The operation of this assembly is well-known to specialists and therefore requires no detailed description.

The distribution of incompressible fluid, for example oil, takes place through a duct 86 formed in the plate 84 and connected with a source of incompressible fluid. This duct leads into a groove 87 supplying through an annular chamber 88 formed in the ring gear 83 the fluid-trapping pockets formed successively between the rotor 82 and the stator 83. On the other hand, the hollow shaft 80 is provided with a flange or plate 89 so as to form between this flange or plate 89 and the eccentric 81 another semi-annular chamber 90 communicating with the inner bore 91 of the hollow shaft to provide an exhaust passage for the incompressible fluid.

Mounted in a circular cavity 92 formed in the flange 85 and centered on the axis Y—Y of the hollow shaft 80 is a flange 93 rigid with a secondary shaft 94. The circular face of the flange 93 is substantially flush with the inner face of the end plate 85. In the pinion 82 there is formed a circular shallow cavity 95 centered on the axis X—X of the eccentric 81. The flange 93 and rotor 82 are interconnected through a series of relatively small links 96, of which six are provided in this example. The pin 97 of each link 96 is journalled in a bore 98 formed in the rotor and the other pin 99 is journalled in a bore 100 formed in the flange 93. The distance between the centers of pins 97 and 99 is equal to the throw of the eccentric and the bores 98 and 100 are spaced at same angular intervals on circles of same radii centered on the axes X—X and Y—Y, respectively.

When the rotor 82 is driven for rotation about the axis Y—Y by the pressure of the incompressible fluid distributed through the annular chamber 88, it rotates in a direction opposite to that of the hollow shaft 80 at a velocity equal to ⅛ of the shaft speed, and at the same time this rotor drives in turn through the set of links 96 the secondary or driven shaft 94 about the axis Y—Y at a velocity equal to that of the primary shaft 80. Thus, the assembly operates as a reduction gear.

The chambers 88 and 90 are designed to act like the peripheral indentations 9 and 12 of the machine illustrated in Figs. 1 to 3.

The assembly illustrated in Figs. 18 and 19 may be utilized as a motor, servo-motor or reduction-gear in a power transmission operating at a relatively low and constant velocity.

An arrangement of the same character may be employed to constitute a power transmission operating at a relatively low but variable velocity by causing the maximum volume and minimum volume of the pockets to vary, as described with reference to Figs. 15 and 16 thereof.

Of course, anybody conversant with the art will readily understand that many modifications may be brought to the devices and arrangements described hereinabove and illustrated in the accompanying drawings, without departing from the spirit and scope of the invention.

What I claim is:

1. In an internal gear machine having a casing which houses a mating pair of intermeshing toothed members formed by an internally toothed ring gear which is held against rotation and a pinion having one tooth less than said gear and mounted on an eccentric carried by a rotary shaft coaxial with said ring gear, said gear and said pinion being housed in a casing; the improvement which comprises two flanges closing laterally said casing on either sides of the meshing toothed members, one at least of said flanges being formed with at least one port, the total number of ports being at least equal to two, said ports being connected to an inlet and an exhaust of fluid, respectively, and rotary means controlled by the rotary movement of the rotary shaft for opening and closing said ports in relation to the angular position of the rotary shaft with a view to obtain a fluid connection between the variable-volume pockets defined between the teeth of the ring gear and of the pinion, on the one hand, and the inlet and exhaust ports, on the other hand, during at least one part of the expansion and contraction phases of said pockets, respectively.

2. A conjugate gear machine, according to claim 1, wherein the fluid connection of the variable-volume pockets with the inlet and exhaust ports is permanent in the case of incompressible fluid.

3. A conjugate gear machine, according to claim 1, wherein the fluid connection of the variable-volume pockets with the inlet and exhaust ports exists only during fractions of the expansion and contraction phases, rsepectively in the case of compressible fluid.

4. A conjugate gear machine, according to claim 1, wherein each flange is formed with one port and with a circular recess communicating with said port and wherein the rotary means controlled by the rotary movement of the rotary shaft for opening and closing the ports comprises a pair of distributor discs carried by the rotary shaft and respectively located between the meshing toothed members and the flanges, one of said discs being utilized for the fluid inlet and the other for the fluid exhaust, each of said discs being formed with a substantially semi-circular indentation opening in the circular recess formed in the corresponding flange for communicating with the port machined in said flange, the indentations of said discs being disposed symmetrically with respect to the diametral plane which divides into two equal parts the maximum-volume pocket and the minimum-volume pocket, the end portions of said indentations having the same outline as the registering teeth of the pinion, whereby the gear machine is usable with an incompressible fluid.

5. A conjugate gear machine, according to claim 4, wherein the semi-circular indentations have a radial width decreasing from the maximum-volume pocket to the minimum-volume pocket.

6. A conjugate gear machine, according to claim 1, wherein each flange is formed with one port and with a circular recess communicating with said port and wherein the rotary means controlled by the rotary movement of the rotary shaft for opening and closing the ports comprises a pair of distributor discs carried by the rotary shaft and respectively located between the meshing toothed members and the flanges, the first one used for the fluid inlet being formed with a substantially semi-circular indentation extending from the maximum-volume pocket to the minimum-volume pocket in the rotary direction of the pinion, while hte second one used for the fluid exhaust is formed with an indentation having an angular development less than 180° and extending in said rotary direction from the minimum-volume pocket to an intermediate-volume pocket for communicating with said variable volume pockets during the terminal period of their contraction phase, said indentations opening in the circular recesses formed in the flanges for communicating with the ports respectively machined in said flanges, the end portions of said indentations having the same outline as the registering teeth of the pinion, whereby the gear machine is usable for generating differences of pressure, such as a compressor and a vacuum pump.

7. A conjugate gear machine, according to claim 6, wherein the angular development of the indentation pertaining to the outlet disc is determined as a function of the maximum pressure to be obtained to the fluid.

8. A conjugate gear machine, according to claim 1, wherein the inlet flange is formed with one inlet port and with a circular recess communicating with said port while the exhaust flange is formed with exhaust ports the number of which is equal to that of the ring gear teeth and which are angularly equispaced around the rotation axis of the rotary shaft and so disposed and dimensioned that each one of said exhaust port communicates with the registering variable-volume pocket in the vicinity of the position corresponding to maximum expansion and during one fraction of the time period in which the volume of said pocket is substantially constant while being closed in any other position by the pinion teeth, and wherein the rotary means controlled by the rotary movement of the rotary shaft for opening and closing said ports comprises the pinion itself for the exhaust ports and, for the inlet port, an inlet distributor disc carried by the rotary shaft and located between the meshing tooth members and the inlet flange, said disc being formed with an indentation having an angular development less than 180° and extending from an intermediate-volume pocket to the minimum-volume pocket in the rotary direction of the pinion for communicating with said variable-volume pockets during the initial period of their expansion phase, said indentation opening in the circular recess formed in the inlet flange while its end portions have the same outline as the registering teeth of the pinion, whereby the machine is usable as motor with compressible fluid.

9. A conjugate gear machine, according to claim 8, wherein the exhaust ports formed in the exhaust flange are of substantially triangular shape, the sides of the triangle being formed by circular arcs which respectively coincide with the root outline and with the outline of the portions of the pinion teeth which are adjacent to said root outline.

10. A conjugate gear machine, according to claim 8, wherein said machine further comprises means for varying the inlet time of the fluid whereby the machine is usable as a compressible fluid motor operating under variable torque and velocity in a power transmission of the variable type fed by a compressor operating under constant velocity and constant delivery-pressure.

11. A conjugate gear machine, according to claim 10, wherein the means for varying the inlet time of the compressed fluid comprises an inlet distributor disc assembly carried by the rotary shaft and formed with an indentation with adjustable angular development and means for adjusting the angular development of said indentation according to the desired inlet time.

12. A conjugate gear machine, according to claim 11, wherein the distributor disc assembly comprises a pair of discs connected with the rotary shaft and adapted to rotate in relation to each other through one fraction of a revolution, said discs being formed with peripheral indentations, and wherein the means for adjusting the angular development of the resulting indentation formed by said indentations comprises a sleeve member slidably mounted on the rotary shaft and rotating with the same, said sleeve member being formed with a helical groove, and pins carried by one of said discs and engaging said helical groove.

13. A conjugate gear machine, according to claim 1, wherein the flanges are respectively formed with inlet and exhaust ports the number of which is respectively equal to that of the ring gear teeth and which are angularly equispaced around the rotation axis of the rotary shaft, the positions and shapes of said ports being determined to ensure their opening and closing at selected times of the cycle of operation of the machine through relative displacement of the pinion with respect to the internal gear with a view to obtain a communication between each one of said ports and the registering variable-volume pocket in the vicinity of the position corresponding to maximum expansion and during one fraction of the time period in which the volume of said pocket is substantially constant, whereby the machine is usable as an internal combustion engine.

14. A conjugate gear machine, according to claim 13, wherein the exhaust and inlet ports are of substantially triangular shape, the sides of the triangle being formed by circular arcs which respectively coincide with the root outline and with the outline of the portions of the pinion teeth which are adjacent to said root outline.

15. A conjugate gear machine, according to claim 1, wherein one flange is formed with two ports respectively connected to the inlet and to the exhaust of fluid machine and with two annular manifolds respectively communicating with said ports and wherein the rotary means controlled by the rotary movement of the rotary shaft for opening and closing said ports comprises a distributor carried by the rotary shaft, located between the meshing toothed members and said flange formed with ports, and formed with two semi-annular outer grooves respectively communicating through ducts with said manifolds, and a stationary sleeve member surrounding said distributor and formed with radial ducts aligned on the axes of the roots of the ring gear teeth for interconnecting said semi-annular outer grooves and the variable-volume pockets, said semi-annular outer grooves being disposed symmetrically with respect to the diametral plane which divides into two equal parts the maximum-volume pocket and the minimum volume pocket, said machine further comprising means for varying the maximum and minimum volumes of said variable-volume pockets, whereby the machine is usable as an incompressible fluid motor in a power transmission of the variable type fed by a pump operating under constant output and constant delivery-pressure.

16. A conjugate gear machine, according to claim 15, wherein the sleeve member has an outer cross-sectional outline which corresponds to the inner outline of the ring gear teeth and wherein the means for varying the maximum and minimum volumes of the variable-volume pockets comprises the ring gear slidably mounted on the pinion and on the sleeve member, a flanged disc obturating said ring gear at its end opposite to said sleeve member and the internal cross-sectional area of which corresponds in shape to the outline of the pinion teeth, means for constantly urging said flanged disc against the lateral surface of said ring gear, means for connecting with each other the chambers formed on either side of the ring gear within the machine casing, and means for adjusting the axial position of the slidable ring gear with respect to the pinion.

17. A conjugate gear machine, according to claim 16, wherein the means for adjusting the axial position of the slidable ring gear comprises a pinion rotatably mounted on the machine casing and longitudinal rack teeth formed on the outer surface of the ring gear and engaging said pinion.

18. A conjugate gear machine, according to claim 16, wherein the means for adjusting the axial position of the slidable ring gear comprises a lever pivotally mounted on the machine casing and a fork member pivotally mounted on the ring gear and engaged by said lever.

19. A conjugate gear machine, according to claim 16, wherein the means for adjusting the axial position of the slidable ring gear operates automatically.

20. A conjugate gear machine, according to claim 19, wherein the means for automatically adjusting the axial position of the slidable ring gear comprises a duct interconnecting the exhaust of fluid and a cylindrical chamber machined in the machine casing on a part of its inner surface facing the pinion, said cylindrical chamber ending beyond the opening of said duct in the decreasing direction for the volume of the variable-volume pockets with a shoulder provided with a bevel-cut portion of slight slope, a radial trailing duct being formed through the part of the ring gear which slides within said cylindrical chamber for leading into the latter, a pipe branched on the inlet of fluid and connecting said inlet with one of the chambers existing on either side of the slidable ring gear, and a pressure reducing device inserted in said branched pipe, whereby the latter delivers the static inlet pressure to said last chamber.

21. A conjugate gear machine, according to claim 1, further comprising means for directly utilizing the torque applied by the fluid to the pinion proper, whereby the machine is usable as a fluid clutch.

22. A conjugate gear machine, according to claim 21, wherein one flange is formed with one port for the fluid inlet and with an annular recess communicating with said port, while the rotary shaft is formed in its portion passing through said flange with an inner bore acting as fluid exhaust, wherein the rotary means controlled by the rotary movement of the rotary shaft for opening and closing said port and said bore comprises a plate carried by the rotary shaft between said flange and the eccentric, said plate being formed with a peripheral indentation interconnecting the variable-volume pockets during their contraction phase and the annular recess of the flange through a chamber machined in the ring gear and with a semi-annular chamber interconnecting the variable-volume pockets during their expansion phase and the inner bore of the rotary shaft, and wherein the means for directly utilizing the torque applied by the fluid to the pinion proper comprises a secondary shaft aligned on the rotary shaft and passing through the other flange and a coupling device connecting said secondary shaft and the pinion with a view to transmit to said secondary shaft the eccentric movement of said pinion with respect to the shaft axis, whereby, if $n$ is the teeth number of the ring gear, the machine may be used either as an induction gear having a ratio equal to $$\frac{1}{n}$$

when an impact movement is applied to the rotary shaft, or as a stop-up gear with ratio $-n$ when an impact movement is applied to the secondary shaft.

23. A conjugate gear machine, according to claim 22, wherein the coupling device comprises a flat flange mounted endwise of the secondary shaft and a series of relatively small links having one pin journalled in a bore formed in the pinion and the other pin journalled in a bore formed in said flange, the distance between the centers of these pins being equal to the throw of the eccentric in the machine, the bores formed in the flange and pinion being formed in these members at the same angular spacing on circles of same radii.

References Cited in the file of this patent

UNITED STATES PATENTS

| | | |
|---|---|---|
| 211,582 | Nash | Jan. 21, 1879 |
| 1,026,662 | Eisner | May 21, 1912 |
| 1,389,189 | Feuerheerd | Aug. 30, 1921 |
| 1,613,525 | Munro | Jan. 4, 1927 |
| 2,101,899 | Eddins | Dec. 14, 1937 |
| 2,138,490 | Haller | Nov. 29, 1938 |
| 2,162,771 | Winans | June 20, 1939 |
| 2,240,874 | Thomas et al. | May 6, 1941 |
| 2,275,321 | Scates | Mar. 3, 1942 |
| 2,417,701 | Parsons | Mar. 18, 1947 |
| 2,478,924 | Johnson | Aug. 16, 1949 |
| 2,498,733 | Boxer | Feb. 28, 1950 |
| 2,509,321 | Topanelian | May 30, 1950 |
| 2,565,250 | Mahlon et al. | Aug. 21, 1951 |